United States Patent [19]

Olsen

[11] Patent Number: 4,603,731
[45] Date of Patent: Aug. 5, 1986

[54] GRAPHITE FIBER THERMAL RADIATOR

[75] Inventor: Randall B. Olsen, Olivenhain, Calif.

[73] Assignee: GA Technologies Inc., San Diego, Calif.

[21] Appl. No.: 674,052

[22] Filed: Nov. 21, 1984

[51] Int. Cl.⁴ .............................................. F28F 1/30
[52] U.S. Cl. ...................................... 165/41; 165/86; 165/171; 165/185
[58] Field of Search .......................... 165/185, 171, 41

[56] References Cited

U.S. PATENT DOCUMENTS

| | | |
|---|---|---|
| 3,095,162 | 6/1963 | Keon . |
| 3,154,926 | 11/1964 | Hirschborn . |
| 3,372,739 | 3/1968 | Kastovich . |
| 3,490,718 | 1/1970 | Vary . |
| 3,648,768 | 3/1972 | Scholl . |
| 3,710,572 | 1/1973 | Herud ................................ 165/185 |
| 3,768,760 | 10/1973 | Jensen . |
| 3,776,139 | 12/1973 | Leomand . |
| 3,913,666 | 10/1975 | Bayliss ................................ 165/185 |
| 4,355,684 | 10/1982 | Caines . |

FOREIGN PATENT DOCUMENTS 2429988  2/1980  France ................................ 165/185

OTHER PUBLICATIONS

"Heat-Rejection Design for Large Concentrating Solar Arrays" Edward P. French, Copyright 1980, by American Institute of Aeronautics and Astronautics, Inc.

"Structural Improvement of Carbon Fibers Prepared from Benzene" Morinobu Endo et al., Japanese Journal of Applied Physics, vol. 15, No. 11, Nov. 1976, pp. 2073–2076, (Translated into English).

Primary Examiner—Albert W. Davis, Jr.
Attorney, Agent, or Firm—Fitch, Even, Tabin & Flannery

[57] ABSTRACT

A thermal radiating system particularly suited for use in space applications is provided with a high ratio of heat transfer to weight and a thin and light weight construction. The radiator includes heat pipes that are spaced to minimize damage from micrometeorites and through which a heat transfer medium is circulated from a heat generating source. Graphite fibers are used for their small mass per unit area and are preferably of a heat treated type having a substantially improved thermal conductivity over conventional graphite fibers. The graphite fibers are associated with the heat pipes and constitute the principal radiating surface of the system. In one embodiment, the graphite fibers are disposed in substantially parallel, co-planar relationship with respect to each other and in substantially perpendicular relationship to their associated heat pipe, thus giving the radiator in the array the appearance of a comb. In a second embodiment, the graphite fibers are in the form of a belt that is entrained about two rotatable heat pipes.

5 Claims, 2 Drawing Figures

GRAPHITE FIBER THERMAL RADIATOR

BACKGROUND OF THE INVENTION

This invention relates to thermal radiators, and, more particularly to radiators suitable for use in conjunction with systems for generating power in space.

Presently, growing requirements for space power in the multi-hundred kilowatt range are expected, particularly in light of the success of the space shuttle program, and it is anticipated that such power requirements will be met by solar, chemical (by means of batteries) or nuclear generation of power. Regardless of the method of generation of power, means for rejecting the heat created by the power generation by radiating the heat into free space is likely to be required (In space, the only way heat can be dissipated is through radiation.)

With specific reference to the solar generation of power, the solar arrays used to generate the power in space generally include four major components: a primary structure, which supports and extends the array as a whole; either reflecting or refracting optical concentrators; heat rejection devices; and a solar panel including cells, substrate, covers and harness.

The cost of solar arrays now being designed or utilized run to several hundred dollars per watt. One way of reducing the cost per watt is to concentrate sunlight so as to require fewer solar cells to generate a given electrical output. However, the concentration of sunlight also results in higher cell temperatures. Because the energy conversion efficiency of solar cells is inversely proportional to the temperature of the cells, the concentration of sunlight requires either acceptance of lower cell performance characteristics or the introduction of heat rejection methods, such as radiators.

Radiative heat rejection systems are generally area intensive, and, therefore, the larger and more massive the structure, the greater its rate of heat transfer. However, for space applications, it is desirable to keep the mass of the solar array as low as possible. Thus, typical honeycomb or aluminium pipe structures having a sufficiently high heat transfer rate are likely to be too heavy for space usage.

Because of their long life and modularization capabilities, semi-passive radiators—radiators in which heat pipes carry heat by vapor transport from evaporator sections located near the solar cells to condensation sections attached to extended radiating surfaces—are preferred for space applications, as opposed to active radiators (in which heat transfer fluid is pumped between the cell region and the radiating surface), or passive radiators (in which heat is transported to the radiator solely by conduction). In semi-passive radiators, the cost of the heat pipes dominates the cost of the radiator as a whole due to high fabrication expenses for the pipes, the close tolerances required in assembling the system, and the time-consuming nature of filling the pipes with the heat transfer fluid and then testing the pipes. Further, damage to the heat pipes due to environmental hazards such as micrometeorite impact is particularly critical, as a damaged heat pipe could leak its heat transport fluid. Thus, thermal radiator design for space should minimize damage potential from micrometeorites, a consideration of no concern to non-space thermal radiators.

Another consideration for a space radiator is that the material have superior ionizing radiation resistance, which consideration is not present in the usual non-space radiator. The heat rejection capability of any radiator is also indirectly proportional to its emissivity.

SUMMARY OF THE INVENTION

Accordingly, it is the primary object of the present invention to provide a thermal radiator for use in conjunction with space power generating systems in which the radiator has a high ratio of heat transfer to weight.

It is a related object to provide such a radiator that is resistant to solar radiation.

A further object is to provide a thermal radiator that is less susceptible to damage due to environmental hazards.

The above-stated objects, as well as other advantages that will become apparent upon reference to the drawings and following detailed description, are met by a heat exchange device in which a heat exchange medium is transported from the area where the heat is generated into metallic heat pipes having graphite fibers associated therewith and constituting the major radiating surface of the device.

DETAILED DESCRIPTION OF THE PREFERRED EMBODIMENTS

Figure 1:
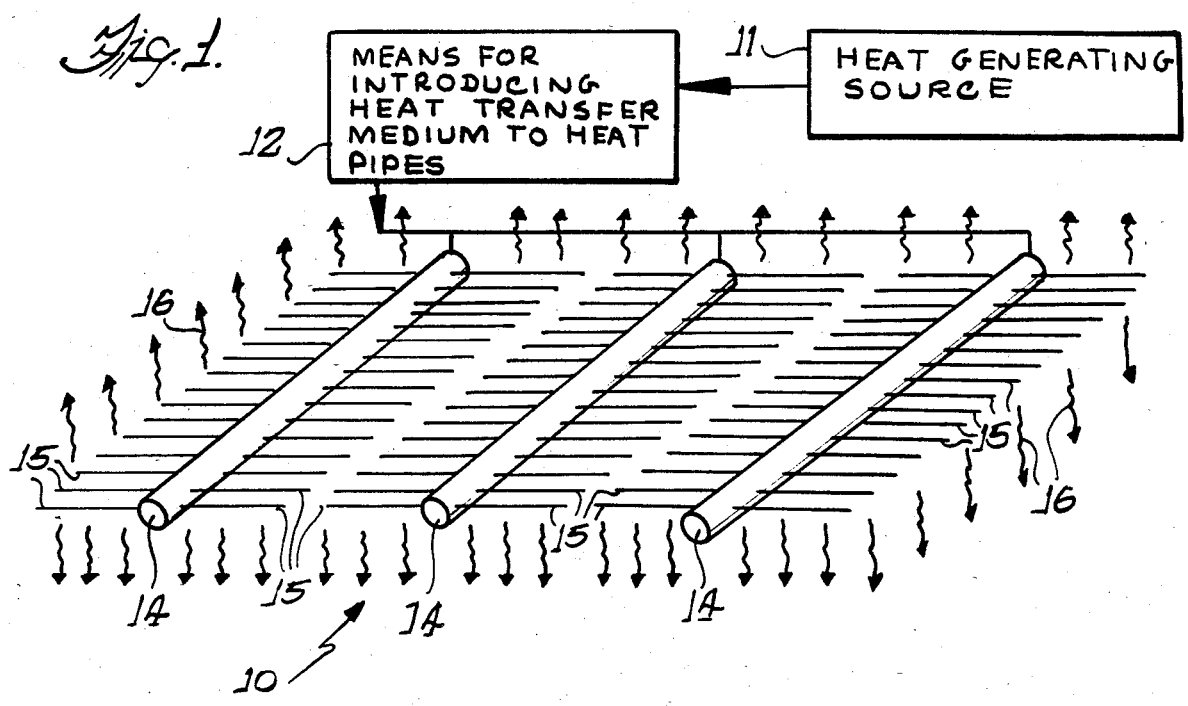
FIG. 1 is a perspective view of an array of comb-type thermal radiators embodying the instant invention.

Referring to FIG. 1, there is seen an array of three comb-type thermal radiators generally indicated by 10. Such an array 10 will be operatively connected to a source of heat, indicated schematically by 11. As previously noted, in space power generating applications, the source of such heat may be a solar array, a nuclear reactor, or a battery. The radiators 10 will be connected to the heat source 11 by means 12, to form a closed system in which a heat transfer medium is circulated. Circulation of the heat transfer medium through the system may be either by vapor transport, as is the case in semi-passive radiating systems, or by a pump, as is the case in active radiating systems. The heat transfer medium may be any of the well-known fluids such as non-phase change gases, phase change gases, liquid metals, such as mercury, or the alkali metals.

The means 12 for introducing the heat transfer medium to the radiators is in fluid communication with the heat pipes 14 that form a part of the inventive radiating system. The heat pipes 14 are preferably made of stainless steel and, in the embodiment depicted in FIG. 1, it is contemplated that the wall of each heat pipe 14 will be on the order of 0.25 mm thick, while the diameter will be on the order of 1 cm.

In order to radiate away from the system the heat carried by the transfer medium into the pipes 14, elongated graphite fibers 15 are associated with each heat pipe 14. The fibers 15 are arranged in substantially parallel co-planar relationship to each other, and substantially perpendicular relationship to their associated heat pipe much like the teeth of a comb. Additionally, the graphite fibers 15 of each heat pipe 14 in the array will lie in substantially the same plane. As a result, the greater part of the heat radiated by the graphite fibers 15, as indicated generally by the "radiation" arrows 16, is radiated into free space rather than into another radiating surface. In the illustrated embodiment, it is contemplated that each of the graphite fibers 15 will be approximately 3 cm in length and will be bonded to its respective heat pipe 14 by means of epoxy.

As is well-known, graphite fibers exhibit excellent structural characteristics, specifically high strength and elastic modulus, as well as having excellent thermal conductivity. Most important with respect to space radiator applications, graphite fibers have a low mass per unit area and have superior ionizing radiation resistance. While existing radiator designs have a mass per unit area in the range of 2.5 kg/m$^2$, the components of the illustrated radiator have a mass per unit area of 1.4 kg/m$^2$ and 0.02 kg/m$^2$ for the heat pipes 14 and the graphite fibers 15, respectively. Further, the illustrated radiator array is less susceptible to micrometeorite damage because the vital area of the radiator has been decreased, i.e., the area of the radiator through which the heat transfer fluid circulates is reduced because the fluid is not circulated through the fibers, which constitute the principal radiating surface of the device, and, consequently, the amount of heat pipe can be reduced.

Union Carbide Corporation produces commercial grade graphite fibers, designated "P-100" fibers, that have a thermal conductivity ranging between 0.1–0.6 watt/cm K, and are suitable for use in space radiators. However, it is preferred that heat-treated graphite fibers be utilized in the illustrated radiator. Heat treating of graphite fibers improves the orientation of the graphite planes with respect to the fiber axis, causing the graphite planes to become almost completely parallel to the fiber axis. Another class of heat-treated fibers have structural characteristics superior to ordinary fibers and have an extremely high rate of thermal conductivity: approximately 10–30 watt/cm K. Such fibers are benzene derived fibers and are called "Endo" fibers after Morinobu Endo, who has studied heat treated graphite fibers and has reported their various properties. See, e.g., Japanese Journal of Applied Physics, Vol. 15, No. 11, November, 1976 at pp. 2073–2076.

Figure 2:
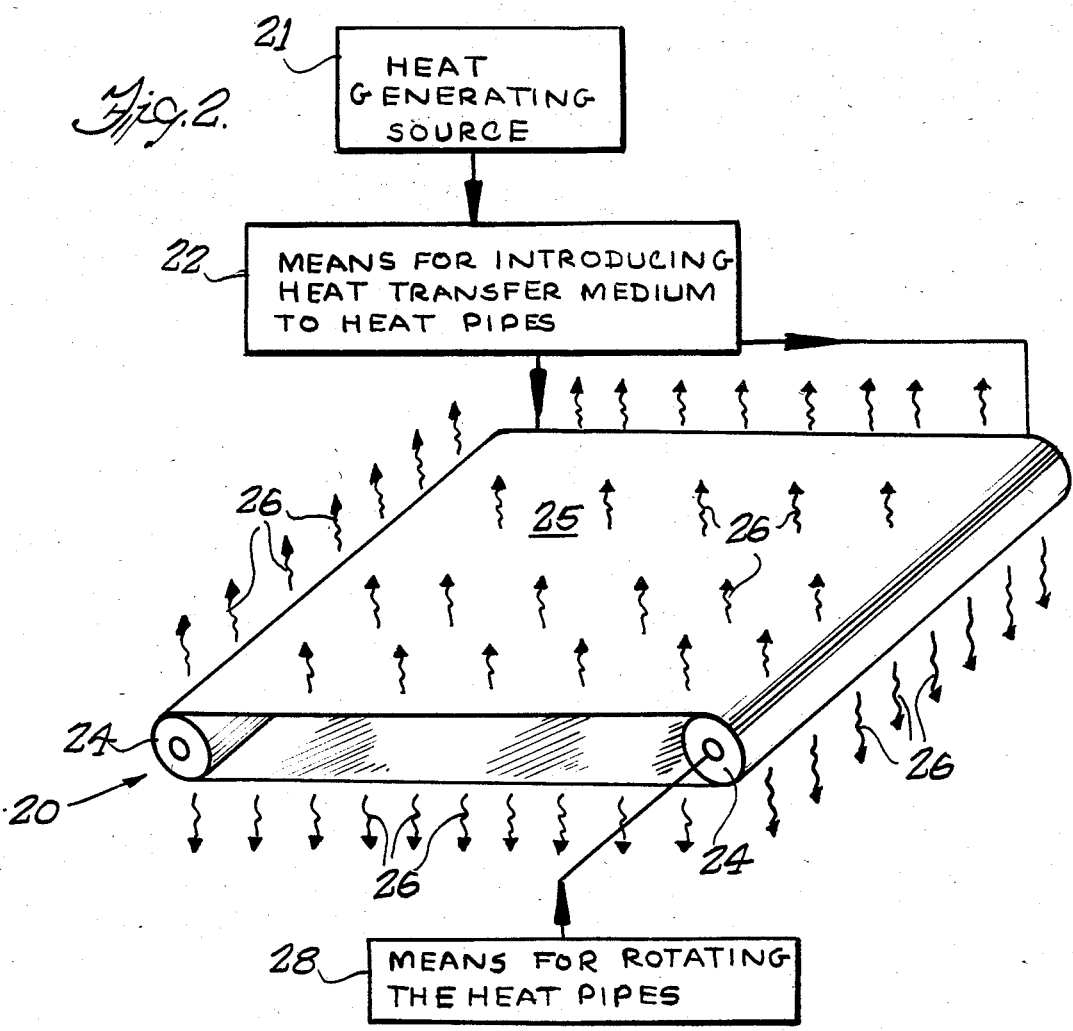
FIG. 2 is a perspective view of a belt-type thermal radiator embodying the instant invention.

Turning now to FIG. 2, there is seen an alternate embodiment of the inventive radiator in which graphite fibers in the form of the belt are trained about two heat pipes that are rotatable about their longitudinal axes. Because of the large radiating area provided by the many fibers constituting the belt, a great deal of heat, as indicated by arrows 26, can be radiated away from the system. As with the embodiment of FIG. 1, the radiator, generally indicated by 20, is in fluid communication with a heat generating source 21 by means 22 for introduing the heat transfer medium to the heat pipes, 21 and 22 both being shown schematically in FIG. 2. The radiator includes two heat pipes 24 in spaced parallel relation, each being at least 1 cm in diameter so as to permit the graphite fibers in the belt 25 to bend thereabout. In the illustrated embodiment, it is contemplated that the heat pipes 24 will be between approximately 0.3–10 meters apart. By rotating the belt about the heat tubes, heat transfer between the tubes and all the fibers of the belt can be effected. In order to rotate the pipes, conventional mechanical means, schematically indicated by 28, are utilized.

While the inventive radiators have been described in terms of certain preferred embodiments, it should be understood that various changes and modifications as would be obvious to one having ordinary skill in the art may be made without departing from the scope of the invention which is defined solely by the appended claims.

What is claimed is:

1. A thermal radiating system for use in conjunction with a heat source to dissipate the heat created thereby comprising, in combination:

a heat transfer fluid in thermal contact with the heat source;

at least one heat pipe through which the heat transfer fluid is circulated;

means for circulating the heat transfer fluid through heat pipes; and a plurality of graphite fibers associated with each heat pipe, the graphite fibers being disposed in substantially parallel co-planar relation to each other, spaced from one another and extending substantially perpendicular to their associated heat pipe, the adjacent fibers being spaced a sufficient distance from each other so that the heat radiated from the fibers substantially radiates into free space.

2. The combination of claim 1 wherein the number of heat pipes is at least two and the graphite fibers associated with each heat pipe are co-planar with the graphite fibers associated with every other heat pipe.

3. The combination of claim 2 wherein the graphite fibers are heat treated to orient the graphite planes substantially parallel to the axis of the fiber.

4. In a thermal radiator for use in outer space to dissipate heat by radiation only, the combination comprising:

an array of at least two heat-conducting conduits disposed in substantially parallel, co-planar relation and each carrying a heat transfer fluid therein;

means including a plurality of elongated graphite fibers associated with each heat-conducting conduit, each fiber associated with each heat-conducting conduit being disposed in substantially perpendicular relation to the conduit and extending in substantially parallel, co-planar relation to every other fiber, the graphite fibers associated with each heat conducting conduit being co-planar with the graphite fibers associated with every other heat conducting conduit in the array and having a small mass per unit area, a high ratio of heat transfer by radiation to the mass thereof, and superior ionizing radiation resistance characteristics.

5. A radiator in accordance with claim 4 in which the graphite fibers have a thermal conductivity in the range of 10–30 watt/cm K.

* * * * *